US006500339B2

United States Patent
Ogasawara

(10) Patent No.: US 6,500,339 B2
(45) Date of Patent: Dec. 31, 2002

(54) FILTRATION APPARATUS FOR FILTERING A MACHINING FLUID

(75) Inventor: Susumu Ogasawara, Yamanashi (JP)

(73) Assignee: Makino Milling Machine Co., Ltd., Tokyo (JP)

(*) Notice: Subject to any disclaimer, the term of this patent is extended or adjusted under 35 U.S.C. 154(b) by 0 days.

(21) Appl. No.: 09/749,964

(22) Filed: Dec. 28, 2000

(65) Prior Publication Data
US 2001/0006157 A1 Jul. 5, 2001

(30) Foreign Application Priority Data
Dec. 28, 1999 (JP) ............................. 11-374348

(51) Int. Cl.⁷ ................... B23Q 11/00; B01D 36/04; B01D 29/68
(52) U.S. Cl. ................... 210/295; 210/298; 210/411
(58) Field of Search ................... 210/298, 295, 210/409, 411, 412

(56) References Cited

U.S. PATENT DOCUMENTS

| | | | |
|---|---|---|---|
| 2,374,094 A | * | 4/1945 | Harvuot |
| 3,674,151 A | * | 7/1972 | Freeland |
| 4,394,272 A | * | 7/1983 | Damerau |
| 4,396,506 A | * | 8/1983 | Damerau |
| 5,738,782 A | * | 4/1998 | Schäfer et al. |

FOREIGN PATENT DOCUMENTS

| | | |
|---|---|---|
| JP | 2-44564 | 10/1990 |
| JP | 05-177106 | * 7/1993 |
| JP | 2-512846 | 4/1996 |
| JP | 9-300171 | 11/1997 |

* cited by examiner

Primary Examiner—Thomas M. Lithgow
(74) Attorney, Agent, or Firm—Paul & Paul

(57) ABSTRACT

The invention provides a filtration apparatus for filtering and regenerating a machining fluid. The filtration apparatus includes a dirty tank for receiving the machining fluid and a clean tank fluidly connected to the dirty tank. A filter is provided between the dirty and the clean tanks for filtering the machining fluid which flows from the dirty tank into the clean tank. A conveyer mechanism is provided in the dirty tank for conveying the sediment of particles separated from the machining fluid in the dirty tank. A filter cleaning device are provided for cleaning the filter. The filter cleaning device includes a nozzle bar which is provided in the clean tank for rotation within a plane parallel to the filter means. The nozzle bar directs the machining fluid in the clean tank onto the filter means to blow the particles off the filter means into the dirty tank.

4 Claims, 6 Drawing Sheets

FILTRATION APPARATUS FOR FILTERING A MACHINING FLUID

BACKGROUND OF THE INVENTION

1. Field of the Invention

The invention relates to a filtration apparatus for filtering and regenerating a machining fluid, used for a machining process with a machine tool such as a milling machine, machining center, a grinding machine, or an electric discharge machine.

2. Description of the Related Art

In a machine tool, such as a milling machine, machining center, a grinding machine, or an electric discharge machine, machining fluid is directed to a machining region, between a workpiece to be machined and a tool, to remove heat and chips generated during the machining process. The machining fluid used for the machining process is filtered to separate the chips from the machining fluid. The machining fluid thus treated is recirculated to the machine tool. In the prior art, various filtration apparatuses have been used.

As a first prior art, Japanese Examined Patent Publication (Kokoku) No. 2-44564 describes a filtration apparatus which has a filter drum provided in a dirty tank for containing a machining fluid which has been used in a machining process. The filter drum includes a cylindrical filter and a hollow shaft defining an output port for passing the machining fluid into a clean tank. The machining fluid in the dirty tank flows from the outside to the inside of the cylindrical filter and the machining fluid is filtered to separate the particles suspended in the machining fluid. The dirty tank is provided with a plurality of scrapers for scraping a sediment of the particles separated from the machining fluid. The scrapers are moved by a pair of chains attached to the ends of the scrapers.

In the first prior art, the filter is cleaned by the machining fluid directed onto a portion of the filter which portion is in the air. Therefore, the chips in the form of adhesive sludge can not removed from the filter. Further, the filtration apparatus employs a filter drum which is relatively large. Therefore, the filtration apparatus becomes large and, in particular, it is essentially high and the replacement of the filter is difficult. Further, as described above, the machining fluid flows through the output port defined by the shaft of the drum filter. Therefore, provided around the bearing for supporting the shaft is a rotational sealing member, which is easily worn and continual replacement is required.

As a second prior art, Japanese Patent Publication No. 2512846 describes an apparatus for filtering a coolant for a machine tool. The apparatus includes a dirty tank and a clean tank fluidly connected to the dirty tank with a filter provided therebetween. The dirty tank is provided with a scraper conveyer. In order to wash filter, the filtered coolant in the clean tank is directed to the filter through a nozzle which is movable in the vertical direction.

In the second prior art, the scraper conveyer and the mechanism for moving the nozzle are driven by separate driving mechanisms. Therefore, the manufacturing cost is increased.

As a third prior art, Japanese Unexamined Patent Publication (Kokai) No. 9-300171 describes a filtration system which includes a hinge belt for separating relatively large chips in the form of curls or clusters from a machining fluid and for transporting the chips. However, the hinge belt can not remove relatively small particles. Therefore, the filtration system can further include a fine filter in the form of a rotating drum for separating relatively small chips in the form of sludge suspended in the machining fluid. However, a filtration system with a rotating filter drum has problems similar to those of the first prior art.

SUMMARY OF THE INVENTION

The invention is directed to solve the prior art problems, and to provide an improved filtration apparatus for filtering and regenerating a machining fluid. The filtration apparatus is relatively small, it is easy to replace the filter, and the apparatus can separate chips which are relatively small as well as large curling or clustered chips.

According to the invention, a filtration apparatus for filtering and regenerating a machining fluid, used for a machining process with a machine tool, the machining fluid containing particles generated during the machining process, is provided. The filtration apparatus includes a dirty tank for receiving the machining fluid; a clean tank fluidly connected to the dirty tank; filter means, provided between the dirty and the clean tanks, for filtering the machining fluid which flows from the dirty tank into the clean tank; conveyer means, provided in the dirty tank, for conveying a sediment of particles separated from the machining fluid in the dirty tank; collection means for receiving the particles from the conveyer means; and a filter cleaning for cleaning the filter means, the filter cleaning device including a nozzle bar, provided in the clean tank for rotation within a plane parallel to the filter means, for directing the machining fluid in the clean tank onto the filter means to blow the particles off the filter means into the dirty tank.

According to another feature of the invention, the filtration apparatus includes a dirty tank for receiving the machining fluid; a first clean tank fluidly connected to the dirty tank; a second clean tank fluidly connected to the first clean tank; first filter means, provided between the dirty and the clean tanks, for filtering the machining fluid which flows from the dirty tank into the first clean tank; second filter means, provided between the first and the second clean tanks, for filtering the machining fluid which flows from the first clean tank into the second clean tank; conveyer means, provided in the dirty tank, for conveying a sediment of particles separated from the machining fluid in the dirty tank; collection means for receiving the particles from the conveyer means; a first filter cleaning device for cleaning the first filter means, the first filter cleaning device including a nozzle bar, provided in the first clean tank for rotation within a plane parallel to the first filter means, for directing the machining fluid in the first clean tank to the first filter means to blow the particles off the first filter means into the dirty tank; and a second filter cleaning device for cleaning the second filter means, the second filter cleaning device including a nozzle bar, provided in the second clean tank for rotation within a plane parallel to the second filter means, for directing the machining fluid in the second clean tank to the second filter means to blow the particles off the second filter means into the first clean tank.

DESCRIPTION OF THE DRAWINGS

These and other objects and advantages and further description will now be discussed in connection with the drawings in which.

DESCRIPTION OF THE PREFERRED EMBODIMENTS

Figure 1:
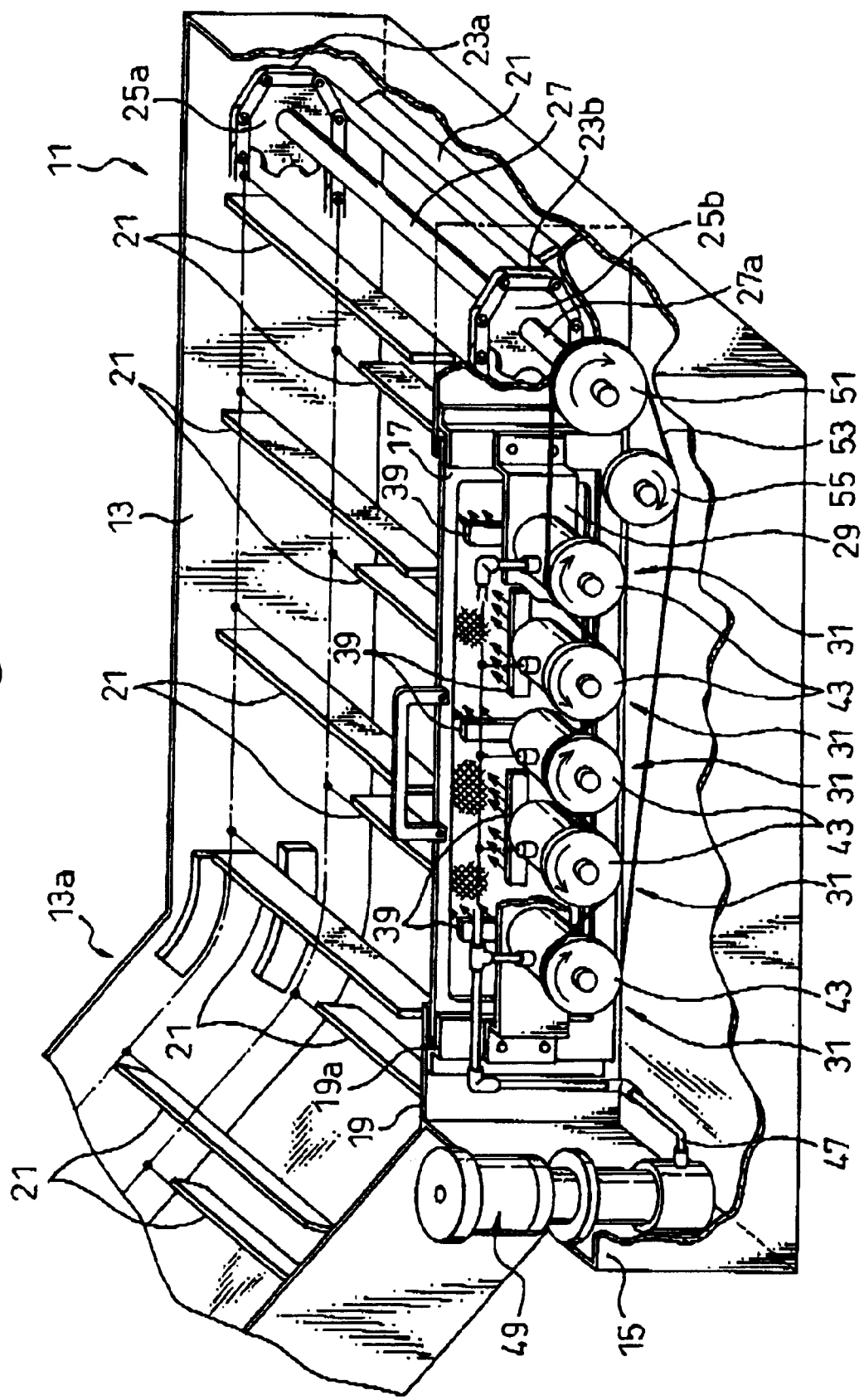
FIG. 1 is a partially broken perspective view of a filtration apparatus according to the first embodiment of the invention.
Figure 2:
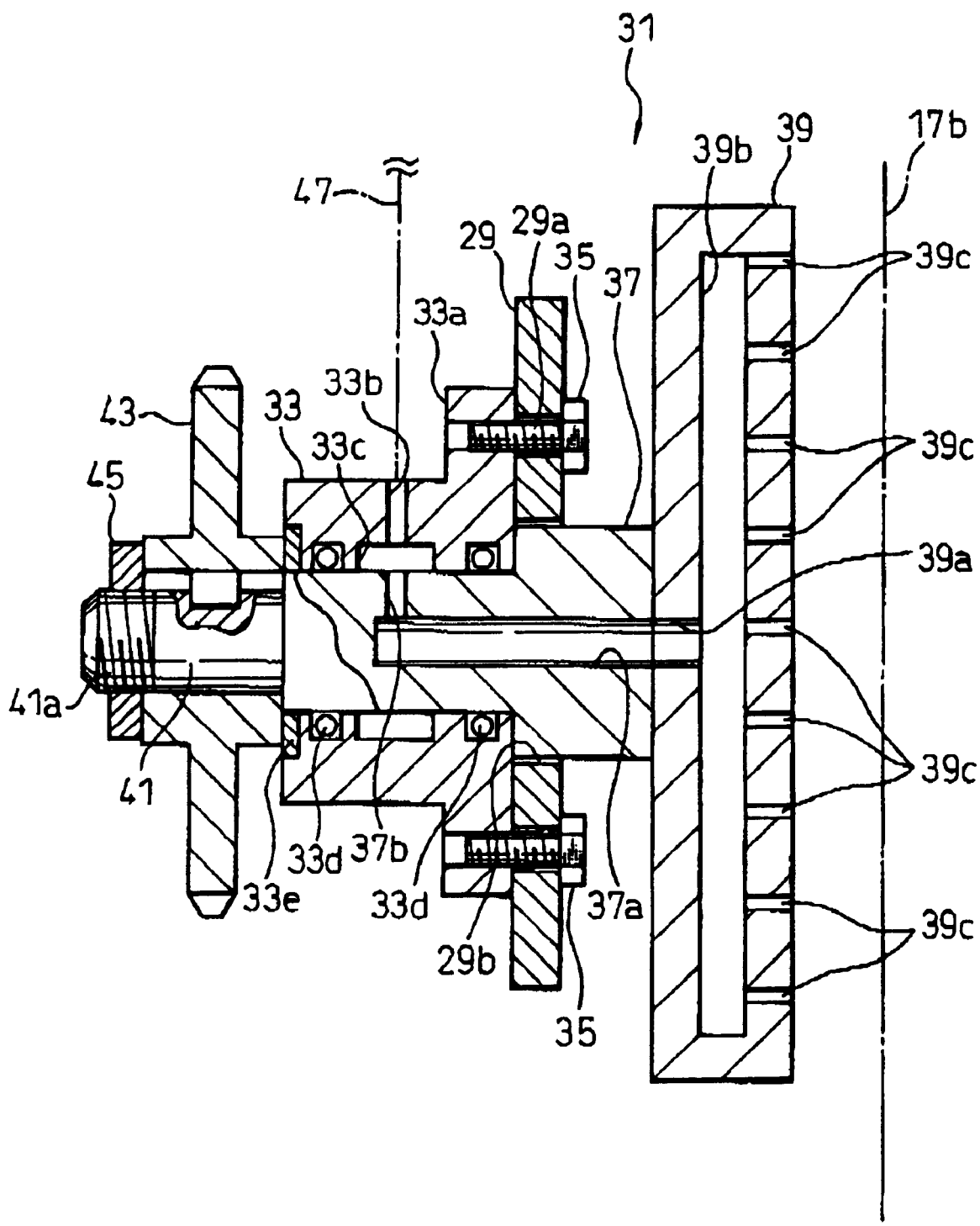
FIG. 2 is section of a filter cleaning device according to the invention.
Figure 3:
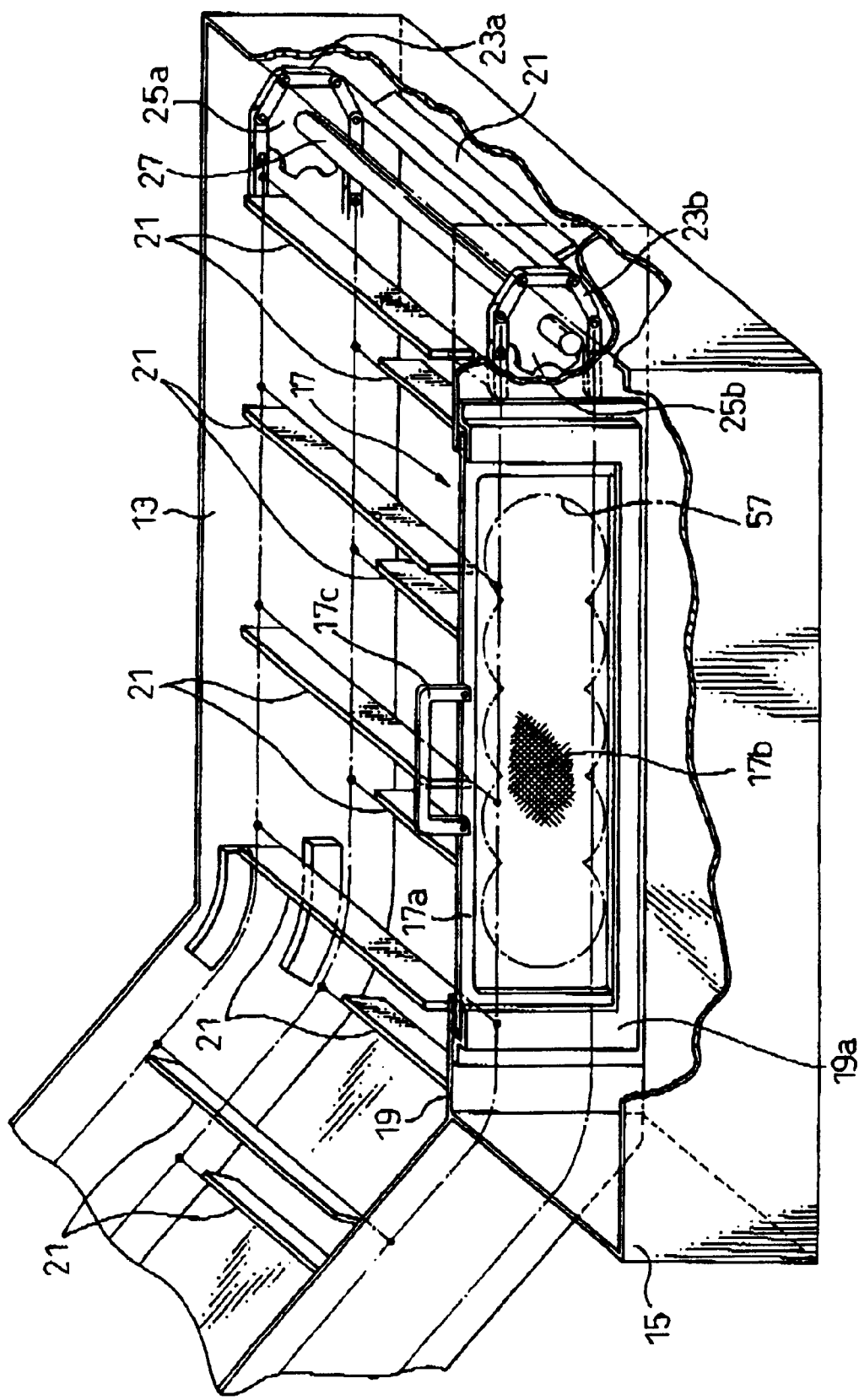
FIG. 3 is a perspective view of the filtration apparatus shown in FIG. 1 in which the filter cleaning devices are removed.

With reference to FIGS. 1–3, the first embodiment of the invention will be described below.

Filtration apparatus 11 is provided with a dirty tank 13 and a clean tank 15 fluidly connected to the dirty tank 13. The dirty tank 13 receives a machining fluid used during a machining process in a machine tool such as a milling machine, a machining center, a grinding machine, or an electric discharge machine. With reference to FIG. 3, provided between the dirty tank 13 and the clean tank 15 is a common partition 19. The partition 19 includes an opening along which a catch 19a, having a section in the form of "C", is provided. The catch 19a removably receives a filter 17 which includes a frame 17a and a screen 17b attached to the frame 17a. The filter 17 further includes a handle 17c which allows an operator to hold the handle 17c for attachment and detachment of the filter 17 to and from the catch 19a in the vertical direction. The mesh size of the screen 17b can be determined depending on the size of particles or chips included in the machining fluid to be filtered and/or in consideration of frequency of the replacement of the filter 17.

A slope 13a extends upwardly from an end of the dirty tank 13. A collection box (not shown), for collecting particles or chips removed from the machining fluid to be filtered, is provided at or under the upper end of the slope 13a. The dirty tank 13 includes an inlet port (not shown) for receiving the machining fluid from the machine tool. The machining fluid supplied to the dirty tank 13 flows into the clean tank 15 through the filter 17, during which the particles or chips contained in the machining fluid deposit on the bottom of the dirty tank 13.

The dirty tank 13 is provided with a chain conveyer as means for scraping a sediment of the particles or chips off the bottom and conveying them along the slope 13a. The chain conveyer includes a pair of endless chains 23a and 23b extending along insides of the side walls of the dirty tank 13 and a plurality of transversely extending scrapers 21 which are attached to the chains 23a and 23b. In particular, the pair of chains 23a and 23b are extended between driven sprockets 25a and 25b, attached to the ends of a driven shaft 27 which is supported by the side walls of the dirty tank 13 for rotation, and driving sprockets (not shown), attached to the ends of a driving shaft (not shown) which is provided at the upper end of the slope 13a so that the chains 23a and 23b are driven by a driving motor (for example, driving motors 141 and 241 shown in FIGS. 4 and 5) which is mechanically connected to the driving shaft.

Within the clean tank 15, a bracket 29 extends parallel to the filter 17. A plurality (five in FIG. 1) of filter cleaning devices 31 are arranged in a row and attached to the bracket 29. With reference to FIG. 2, each of the filter cleaning devices 31 includes a body 33 which provides a bearing, a shaft 37 supported by the body for rotation, a nozzle bar 39 attached to an end of the shaft 37 facing the filter 17 and an input sprocket 43 connected the end of the shaft opposite to the nozzle bar 39.

The body 33 is comprises a hollow cylindrical member having a flange portion 33a for the attachment to the bracket 29. The flange portion 33a includes a plurality of threaded holes for receiving screw bolts 35 for securing the flange portion 33a to the bracket 29. The bracket 29 includes a plurality of through holes 29a corresponding to the threaded holes of the flange portion 33a and a center hole 29b for passing the shaft 37. The end of the shaft 37 is inserted into the through hole 29b after the shaft 37 is mounted to the body 33 for rotation, as shown in FIG. 2. The body 33 is secured to the bracket 29 by the screw bolts 35 after which the nozzle bar 37 is attached to the end of the shaft 37. The bracket 29 is attached inside of the clean tank 15 with the filter cleaning devices attached to the bracket 29.

The body 33 includes a radial passage 33b, defining an inlet port of the filter cleaning device 31, and a groove 33c which is fluidly connected to the radial passage 33b and circumferentially extends along the inner surface of the hollow cylindrical body 33. The shaft 37 includes an axial passage 37a and a radial passage 37b which fluidly opens into the axial passage 37a. The axial passage 37a is fluidly communicated with the radial passage 33b of the body 33 through the radial passage 37b of the shaft 37 and the groove 33c. In this connection, a pair of O-rings 33d may be provided on the either side of the groove 33c.

The nozzle bar 39 comprises a hollow bar member including a space 39b, inlet port 37a which is adapted to be fluidly connected to the space 39b when the nozzle bar 39 is attached to the end of the shaft 37 and a plurality of outwardly directed nozzles 39c which are also fluidly connected to the space 39a. Each of the nozzle bars 39 is immersed in the machining fluid in the clean tank 15 and rotates within a plane substantially parallel to the screen 17b of the filter 17.

The shaft 37 includes an extension 41 provided at the rear end thereof and a threaded portion 41a provided on the outer surface of the extension 41. An input sprocket 43 is mounted to the extension 41 and is secured by nut 45 engaging the threaded portion 41a. In this connection, a sliding member such as a thrust bearing 33e may be provided at the rear end face of the body 33 which end face may contact the input sprocket 43.

A rotational power is transmitted to the filter cleaning devices 31 from the chain conveyer through a power transmission mechanism which includes output sprocket 51 mounted to an extension 27a extending from the driven shaft 27 into the clean tank 15, a chain 53 extending between the output sprocket 51 and the input sprockets 43 of the respective filter cleaning devices 31. As shown in FIG. 1, the nozzle bars 39 are alternatively positioned with phase difference of 90 degrees relative to the nozzle bars 39 of the adjacent filter cleaning devices 31, and the chain 53 extends around the input sprockets 43 of the respective filter cleaning devices 31 so that the nozzle bars 39 rotate in opposite directions relative to the nozzle bars 39 of the adjacent filter cleaning devices 31. This allows the filter cleaning devices 31 to be arranged so that circles defined by the ends of the rotating respective nozzle bars 39 overlap each other to increase the cleanable area on the screen 17b.

The machining fluid in the clean tank 15 is supplied to the filter cleaning devices as cleaning fluid by a machining fluid supplying means which includes a fluid supply pump 48 which is disposed within the clean tank 15, a fluid supply conduit 47 fluidly connecting the fluid supply pump 49 and the inlet ports 33b of the filter cleaning devices 31. Further, the machining fluid in the clean tank 15 is recirculated to the machine tool by a recirculating means provided by a recirculating pump (for example, recirculating pumps 139b and 239b, shown in FIGS. 4 and 5).

The functional operation of the embodiment will be described below.

The particles or chips contained in the machining fluid, supplied to the dirty tank 13 from the machine tool, deposit on the bottom of the dirty tank 13 due to gravity. The sediment of the particles or chips are scraped off the bottom by the scrapers 27 of the chain conveyer and transported along the slope 13a to the collection box provided at or under the upper end of the slope 13a.

Since the machining fluid in the clean tank 15 is drawn by the recirculating pump and recirculated to the machine tool, the machining fluid supplied to the dirty tank 13 flows into the clean tank 15 through the filter 17 At that time, the particles or chips which have not deposited and are still suspended in the machining fluid are captured by the screen 17b of the filter 17. Thus, the particles or chips in the machining fluid are removed primarily by a settling action due to gravity and secondarily by the filtration of the screen 17b. The treated machining fluid in the clean tank 15 is drawn by the recirculating pump and recirculated to the machine tool.

The screen 17b of the filter 17 captures the particles or chips suspended in the machining fluid when it flows into the clean tank 15 from the dirty tank 13. The filter cleaning devices 31 remove the particles or chips from the screen 17b, periodically or continuously. The fluid supply pump 49 pumps the machining fluid within the clean tank 15 to the filter cleaning devices 31 through the fluid conduit 47. The machining fluid supplied to the filter cleaning devices 31 is directed to the screen 17b through the radial passage 33b of the body 33, the groove 33c, the radial passage of the shaft 37, the axial passage 37a, the inlet port 39a of the nozzle bar 39, the space 39b and the nozzles 39c. Thus, the particles or chips attaching to the screen 17b are blown into the dirty tank 13 so that the screen 17b is cleaned.

In this embodiment, the conveyer means and the filter cleaning devices 31 are driven by a common driving motor. However, separate motors may be provided for the conveyer means and the filter cleaning devices 31. The arrangement of the filter cleaning devices 31 for rotating the nozzle bars 39 substantially parallel to the screen 17b is essential.

In the first embodiment of the invention described above, the filtration apparatus 11 includes only one clean tank 15 arranged at one side of the dirty tank 13. However, the present invention is not limited to the arrangement of the first embodiment, and can include two or more clean tanks. In the second embodiment of the invention, shown in FIG. 4, two clean tanks are provided.

Figure 4:
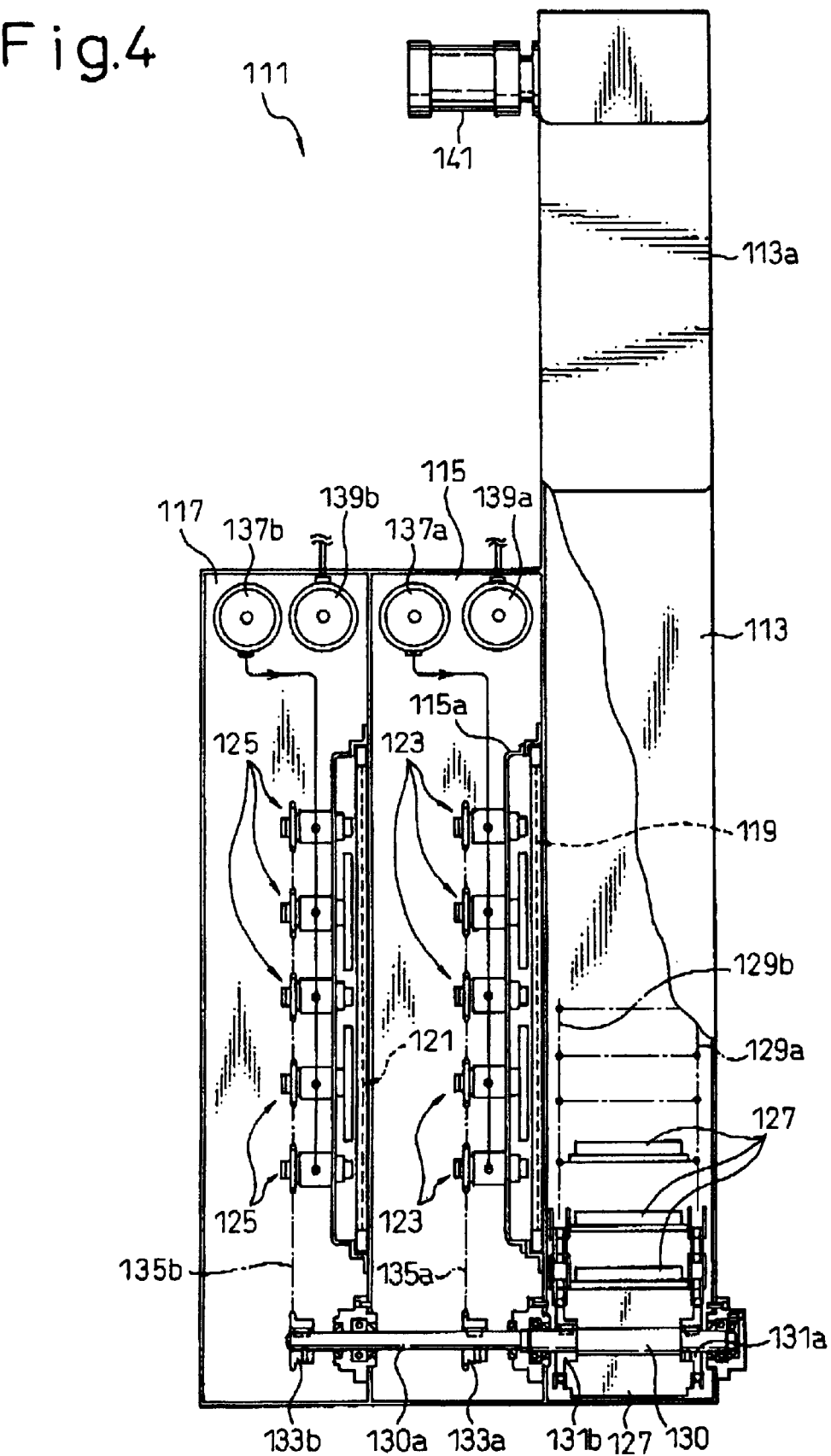
FIG. 4 is a plan view of a filtration apparatus according to the second embodiment of the invention.

With reference to FIG. 4, in the second embodiment of the invention, a filtration apparatus 111 includes a dirty tank 113, a first clean tank 115 arranged at one side of the dirty tank 113 so that the first clean tank 115 is fluidly connected to the dirty tank 113 and a second clean tank 117 arranged at the other side of the first clean tank 115 so that the second clean tank 117 is fluidly connected to the first clean tank 115. The dirty tank 113 receives a machining fluid used during a machining process with a machine tool. A first filter 119 is provided between the dirty tank 113 and the first clean tank 115. Likewise, a second filter 121 is provided between the first clean tank 115 and the second clean tank 117. The first and second filters 119 and 121 are formed substantially the same as the filter 17 of the first embodiment.

The dirty tank 113 is provided with a chain conveyer the same as the first embodiment. The chain conveyer includes a pair of endless chains 129a and 129b which extend along the insides of the side walls of the dirty tank 113 and a plurality of transversely extending scrapers 127 which are attached to the chains 129a and 129b. The pair of chains 129 and 129b are extended between driven sprockets 131a and 131b, attached to a driven shaft 130 which is supported by the side walls of the dirty tank 113 for rotation, and driving sprockets (not shown), attached to the ends of a driving shaft (not shown) connected to a driving motor 141. The driving motor 141 is provided at the upper end of a slope 113a so that the chains 129a and 129b are driven by the driving motor 141.

Within the first clean tank 115, a bracket 115a extends parallel to the first filter 119. A plurality of first filter cleaning devices 123, the same as the filter cleaning devices 31 of the first embodiment, are arranged in a row and attached to the bracket 115a. A first fluid supply pump 137a, for supplying the machining fluid in the first clean tank 115 to the first filter cleaning devices 123, and a first recirculating pump 139a, for recirculating the machining fluid in the first clean tank 115 to the machine tool, are provided in the first clean tank 115.

Within the second clean tank 117, a bracket 117a extends parallel to the second filter 121. A plurality of second filter cleaning devices 125, the same as the filter cleaning devices 31 of the first embodiment, are arranged in a row and attached to the bracket 115a. A second fluid supply pump 137b, for supplying the machining fluid in the second clean tank 117 to the second filter cleaning devices 125, and a second recirculating pump 139b, for recirculating the machining fluid in the second clean tank 115 to the machine tool, are provided in the second clean tank 117.

According to the second embodiment, the driven shaft 130 has an extension 130a which extends through the partition between the dirty tank 113 and the first clean tank 115 and the partition between the first and second clean tanks 115 and 117. First and second sprockets 133a and 133b are attached to the extension 130a. The first and second sprockets 133a and 133b engage with chains 135a and 135b for rotating the first and second filter devices 123 and 125, respectively, as in the first embodiment.

The functional operation of the second embodiment will be described below.

The particles or chips, contained in the machining fluid supplied to the dirty tank 113 from the machine tool, deposit on the bottom of the dirty tank 113 due to gravity. The rotation of the driving motor 141 rotates the chains 129a and 129b to scrape the sediment of the particles or chips off the bottom by the scrapers 127. The scraped sediment are transported along the slope 113a to the collection box provided at or under the upper end of the slope 113a.

When the machining fluid, supplied to the dirty tank 113, flows into the first clean tank 115 through the first filter 119, the particles or chips which have not deposited and still suspended in the machining fluid are captured by the screen of the first filter 119. Thus, the first clean tank 115 contains the machining fluid which has been treated so that the particles or chips are removed primarily by a settling action due to gravity and secondarily by the filtration of the screen of the first filter 119. A portion of the treated machining fluid in the first clean tank 115 is drawn by the recirculating pump 139a and recirculated to the machine tool.

The rest of the machining fluid in the first clean tank 115 further flows into the second clean tank 117 through the second filter 121. At that time, residual of particles or chips are removed by the second filter 121 so that the second clean tank 117 contains highly treated machining fluid. Therefore, it is desirable that the second filter 121 comprises a screen with a mesh size smaller than that of the first filter 119.

The screens of the first and second filters 119 and 121 capture the particles or chips suspended in the machining fluid. The first and second filter cleaning devices 123 and 125 respectively remove the particles or chips from the first and second filters 119 and 121 periodically or continuously. The first and second fluid supply pumps 137a and 137b pump the machining fluid within the first and second clean tanks 115 and 117 to the first and second filter cleaning devices 123 and 125, respectively. The machining fluid supplied to the first and second filter cleaning devices 123 and 125 is directed to the first and second filters 117 and 119 to blow the particles or chips attaching to the first and second filters 117 and 119 into the first dirty tank 113 and the first clean tank 115, respectively. At that time, the nozzle bar of the first and second filter cleaning devices 123 and 125 are rotated by the driving motor 141 through the chains 129a and 129b, the driven sprockets 131a and 131b, the driven shaft 130, first and second output sprockets 133a and 133b, the chains 135a and 135b and the input sprockets of the respective first and second filter cleaning devices 123 and 125.

In the second embodiment shown in FIG. 4, the first and second tanks 115 and 117 are arranged side by side with each other at one side of the dirty tank 113. However, the present invention is not limited to this arrangement. The first and second clean tanks can be arranged in line along one side of the dirty tank and the slope, as shown in FIG. 5.

Figure 5:
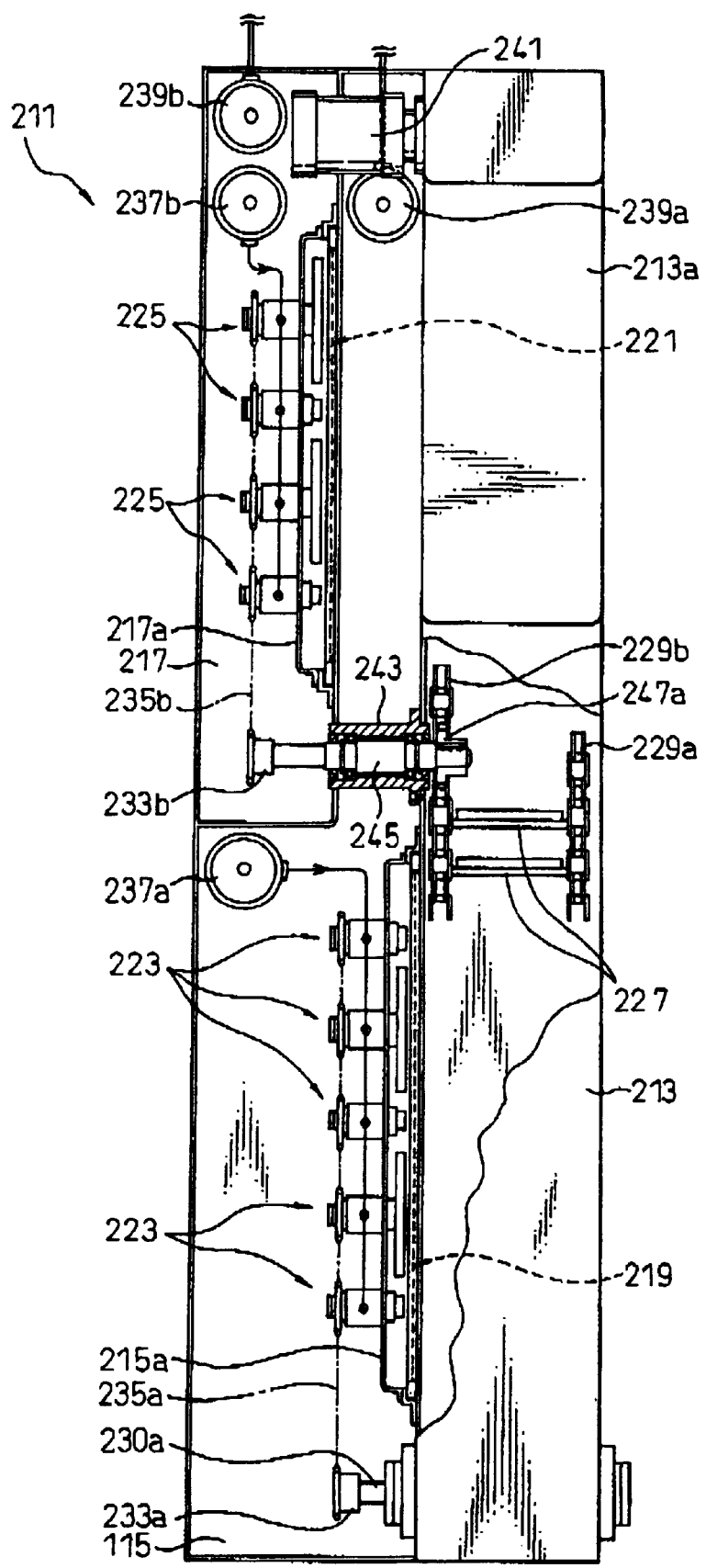
FIG. 5 is a plan view of a filtration apparatus according to the third embodiment of the invention.

In the third embodiment of the invention shown in FIG. 5, a filtration apparatus 211 includes a dirty tank 213, a first clean tank 215 arranged at one side of the dirty tank 213 so that the first clean tank 215 is fluidly connected to the dirty tank 213 and a second clean tank 217 arranged in line relative to the first clean tank 215 so that the second clean tank 217 is fluidly connected to the first clean tank 215. The dirty tank 213 receives a machining fluid used during a machining process with a machine tool. A first filter 219 is provided between the dirty tank 213 and the first clean tank 215. Likewise, a second filter 221 is provided between the first clean tank 215 and the second clean tank 217. The first and second filters 219 and 221 are formed substantially the same as the filter 17 of the first embodiment.

The dirty tank 213 is provided with a chain conveyer the same as the first embodiment. The chain conveyer includes a pair of endless chains 229a and 229b which extend along insides of the side walls of the dirty tank 213 and a plurality of transversely extending scrapers 227 which are attached to the chains 229a and 229b. The pair of chains 229 and 229b are extended between driven sprockets (not shown), attached to a driven shaft (FIG. 5 shows only an extension 230a thereof), supported by the side walls of the dirty tank 213 for rotation, and driving sprockets (not shown), attached to the ends of a driving shaft (not shown), connected to a driving motor 241, provided at the upper end of a slope 213a so that the chains 229a and 229b are driven by the driving motor 241. According to the third embodiment, the chain conveyer further includes an intermediate shaft 245 and an intermediate sprocket 247a which is attached to the intermediate shaft 245 and engages the one of the chains 229a and 229b. The chain 229b engaging the intermediate sprocket 247a is disposed adjacent the first clean tank 217.

Within the first clean tank 215, a bracket 215a extends parallel to the first filter 219. A plurality of first filter cleaning devices 223, the same as the filter cleaning devices 31 of the first embodiment, are arranged in a row and attached to the bracket 215a. A first fluid supply pump 237a, for supplying the machining fluid in the first clean tank 215 to the first filter cleaning devices 223, and a first recirculating pump 239a, for recirculating the machining fluid in the first clean tank 215 to the machine tool, are provided in the first clean tank 215.

Within the second clean tank 217, a bracket 217a extends parallel to the second filter 221. A plurality of second filter cleaning devices 225, similar to the filter cleaning devices 31 of the first embodiment, are arranged in a row and attached to the bracket 215a. A second fluid supply pump 237b, for supplying the machining fluid in the second clean tank 217 to the second filter cleaning devices 225, and a second recirculating pump 239b, for recirculating the machining fluid in the second clean tank 215 to the machine tool, are provided in the second clean tank 217.

According to the second embodiment, the extension 230a of the driven shaft extends through the partition between the dirty tank 213 and the first clean tank 215. A first sprocket 233a is attached to the extension 230a. The first sprocket 233a engages a chain 235a for rotating the first filter devices 223, respectively, as in the first embodiment.

The intermediate shaft 245 is rotatably supported by a hollow bracket 243 which is mounted to opposite side walls, and extends from the dirty tank 213 to the second clean tank 217 through the first clean tank 215. To the end of the intermediate shaft 245 in the second clean tank 217, a second output sprocket 233b is mounted. The second output sprocket 233b engages a chain 235b for rotating the second filter devices 225, respectively, likewise the first embodiment.

The functional operation of the second embodiment will be described below.

The particles or chips contained in the machining fluid, supplied to the dirty tank 213 from the machine tool deposit on the bottom of the dirty tank 213 due to gravity. The rotation of the driving motor 241 rotates the chains 229a and 229b to scrape the sediment of the particles or chips off the bottom by the scrapers 227. The scraped sediment is transported along the slope 213a to the collection box provided at or under the upper end of the slope 213a.

When the machining fluid, supplied to the dirty tank 213, flows into the first clean tank 215 through the first filter 219, the particles or chips which have not deposited and are still suspended in the machining fluid are captured by the screen of the first filter 219. Thus, the first clean tank 215 contains the machining fluid thus treated. A portion of the treated machining fluid in the first clean tank 215 is drawn by the recirculating pump 239a and recirculated to the machine tool. Further, the rest of the machining fluid in the first clean tank 215 flows into the second clean tank 217 through the second filter 221 so that the second clean tank 219 contains highly treated machining fluid.

The screens of the first and second filters 219 and 221 capture the particles or chips suspended in the machining fluid. The first and second filter cleaning devices 223 and 225 respectively remove the particles or chips from the first and second filters 219 and 221 periodically or continuously. The first and second fluid supply pumps 237a and 237b pump the machining fluid within the first and second clean tanks 215 and 217 to the first and second filter cleaning devices 223 and 225, respectively. The machining fluid supplied to the first and second filter cleaning devices 223 and 225 is directed to the first and second filters 219 and 221 to blow the particles or chips attaching to the first and second filters 219 and 221 into the first dirty tank 213 and the first clean tank 215, respectively. At that time, the nozzle bars of the first filter cleaning devices 223 are rotated by the driving motor 241 through the chains 229a and 229b, the driven sprockets, the driven shaft, the first output sprocket 233a, the chain 235a and the input sprockets of the respective first filter cleaning devices 223. Likewise, the nozzle bars of the second filter cleaning devices 225 are rotated by the driving motor 241 through the chain 229b, the intermediate sprocket, the intermediate shaft, the second output sprocket 233b, the chain 235b and the input sprockets of the respective second filter cleaning devices 225.

Figure 6A:
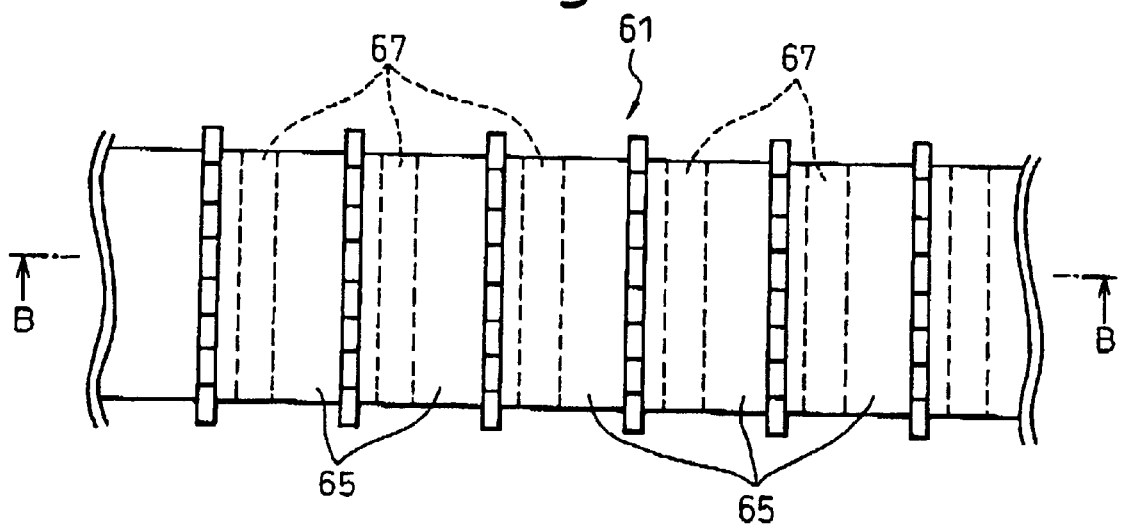
FIG. 6A is a plan view of a modified embodiment of a conveyer means of the invention.
Figure 6B:
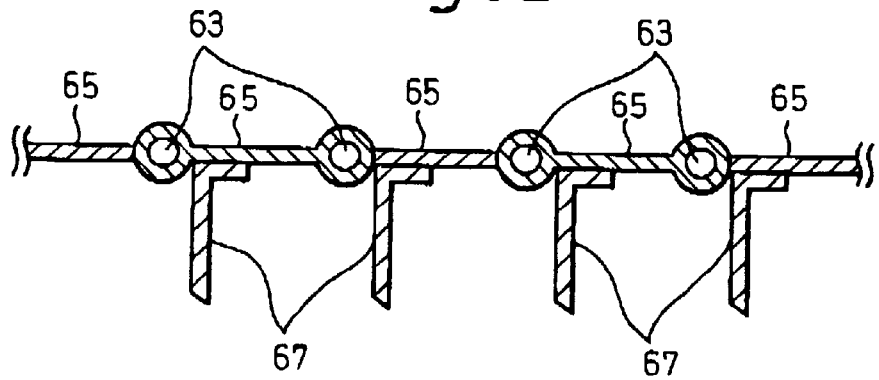
FIG. 6B is a section of the conveyer means shown in FIG. 6A.
Figure 7:
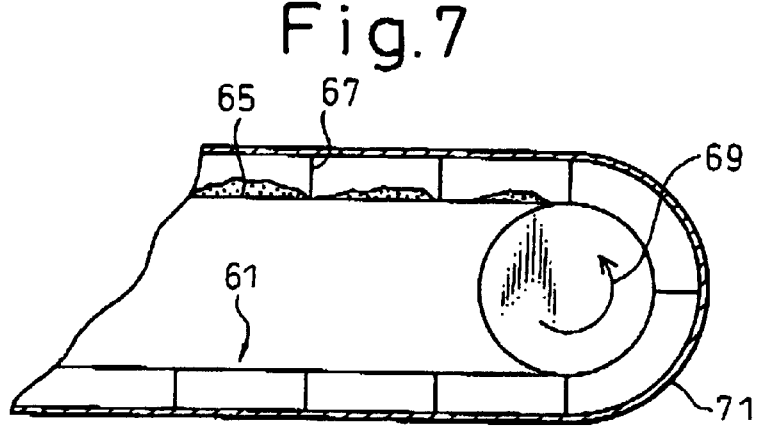
FIG. 7 is a side view of the conveyer means shown in FIGS. 6A and 6B.

In the embodiments described above, the conveyer means comprises a chain conveyer with a pair of chains and a plurality of scrapers attached to the chains. However, the invention is not limited to this arrangement, and the conveyer means can comprise a hinge belt 61, as shown in FIGS. 6A, 6B and 7. The hinge belt 61 includes a plurality of hinge plates 65 connected to each other by pins 63 and scrapers 67 which perpendicularly extend from the respective hinge plates 65. The hinge belt 61 is rotationally driven by chains connected to the either ends of the respective hinge plates 65, as is well known in the art. Further, if the hinge belt 61 is used as the conveyer means, the rotational direction of the hinge belt 61 is preferably the direction away from the slope (not shown in FIG. 7) so that a sediment of the particle or the chips, which has been scraped of the bottom the dirty tank 71, can be put on the upper surface of the hinge plates 65 for the transportation thereof.

It will also be understood by those skilled in the art that the forgoing description is a preferred embodiment of the disclosed device and that various changes and modifications may be made without departing from the spirit and scope of the invention.

I claim:

1. A filtration apparatus for filtering and regenerating a machining fluid, used for a machining process with a machine tool, the machining fluid containing particles generated during the machining process, the filtration apparatus comprising:

a dirty tank for receiving the machining fluid;

a clean tank fluidly connected to the dirty tank;

filter means, provided between the dirty and the clean tank, for filtering the machining fluid which flows from the dirty tank into the clean tank;

conveyer means, provided in the dirty tank, for conveying a sediment of particles separated from the machining fluid in the dirty tank;

collection means for receiving the particles from the conveyer means; and a filter cleaning device for cleaning the filter means, the filter cleaning device including a nozzle bar a plurality of nozzle bars, provided in the clean tank for rotation within a plane parallel to the filter means, for directing the machining fluid in the clean tank onto the filter means to blow the particles off the filter means into the dirty tank, the nozzle bars being alternatively positioned with phase difference of 90 degrees relative to the adjacent nozzle bars.

2. A filtration apparatus according to claim 1, wherein the conveyer means includes an endless chain rotatably provided in the dirty tank; and scrapers, attached to the chain, for scraping the sediment of the particles off the bottom of the dirty tank and for conveying the particles to the collection means.

3. A filtration apparatus according to claim 1, wherein the conveyer means includes a hinge belt provided in the dirty tank, the hinge belt including a plurality of hinge plates, connected to each other by pins, for supporting a sediment on the upper surface of the hinge plates to convey the sediment to the collection means.

4. A filtration apparatus for filtering and regenerating a machining fluid, used for a machining process with a machine tool, the machining fluid containing particles generated during the machining process, the filtration apparatus comprising:

a dirty tank for receiving the machining fluid;

a first clean tank fluidly connected to the dirty tank;

a second clean tank fluidly connected to the first clean tank;

first filter means, provided between the dirty and the clean tanks, for filtering the machining fluid which flows from the dirty tank into the first clean tank;

second filter means, provided between the first and second clean tanks, for filtering the machining fluid which flows from the first clean tank into the second clean tanks;

conveyer means, provided in the dirty tank, for conveying a sediment of particles separated from the machining fluid in the dirty tank;

collection means for receiving the particles from the conveyer means;

a first filter cleaning device for cleaning the first filter means, the first filter cleaning device including a nozzle bar a plurality of nozzle bars, provided in the first clean tank for rotation within a plane parallel to the first filter means, for directing the machining fluid in the first clean tank to the first filter means to blow the particles off the first filter means into the dirty tank, the nozzle bars being alternatively positioned with phase difference of 90 degrees relative to the adjacent nozzle bars; and a second filter cleaning device for cleaning the second filter means, the second filter cleaning device including a nozzle bar a plurality of nozzle bars, provided in the second clean tank for rotation within a plane parallel to the second filter means, for directing machining fluid in the second clean tank to the second filter means to blow the particles off the second filter means into the first clean tank, the nozzle bars being alternatively positioned with phase difference of 90 degrees relative to the adjacent nozzle bars.

* * * * *